United States Patent [19]

Austin et al.

[11] Patent Number: 4,500,496

[45] Date of Patent: Feb. 19, 1985

[54] PROCESS FOR PURIFYING MOLYBDENITE CONCENTRATES

[75] Inventors: James W. Austin, Kelowna; Ronald G. Bradburn, Westbank; Clarence A. Cromwell, Peachland; Eitan Gratch, Toronto; Erich Groiss, Westbank; Derek Perkins; Robert A. Walker, both of Kelowna, all of Canada

[73] Assignee: Brenda Mines Ltd., Peachland, Canada

[21] Appl. No.: 428,607

[22] Filed: Sep. 30, 1982
(Under 37 CFR 1.47)

[30] Foreign Application Priority Data

Apr. 20, 1982 [CA] Canada .................... 401298

[51] Int. Cl.³ .................. C01G 39/00; C01G 21/16
[52] U.S. Cl. ............................... 423/55; 423/493; 75/104; 75/114; 75/117; 75/121
[58] Field of Search ............... 423/53, 55, 493; 75/104, 114, 117, 121

[56] References Cited

U.S. PATENT DOCUMENTS

| 3,674,424 | 7/1972 | Stanley et al. | 23/15 |
|---|---|---|---|
| 3,961,941 | 6/1976 | Baker et al. | 75/104 |
| 4,066,748 | 1/1978 | Lietard et al. | 423/493 |
| 4,082,629 | 4/1978 | Milner et al. | 75/114 |
| 4,083,921 | 4/1978 | Wesely | 423/55 |

FOREIGN PATENT DOCUMENTS

| 879000 | 8/1971 | Canada | 423/53 |
|---|---|---|---|
| 379315 | 10/1922 | Fed. Rep. of Germany . | |

*Primary Examiner*—L. Dewayne Rutledge
*Assistant Examiner*—Christopher W. Brody
*Attorney, Agent, or Firm*—Fleit, Jacobson, Cohn & Price

[57] ABSTRACT

An improved process is disclosed for the treatment of molybdenite concentrate to remove impurities, such as copper and lead therefrom. According to this process, ferrous chloride liquor is introduced into a reactor which is made of a material that can withstand leaching with the use of ferric chloride at elevated temperatures and pressures. Sodium or calcium chloride may also be added to the reactor which is then sealed and subjected to chlorination until the rise in temperature, due to the exothermicity of the reaction, produces the desired concentration of the ferric ion to leach the impurities present in the concentrate to a desired level. Upon completion of the chlorination, the molybdenite concentrate is introduced into the reactor and is leached therein. Finally, the resulting pulp is filtered and washed to obtain the desired purified product.

14 Claims, 1 Drawing Figure

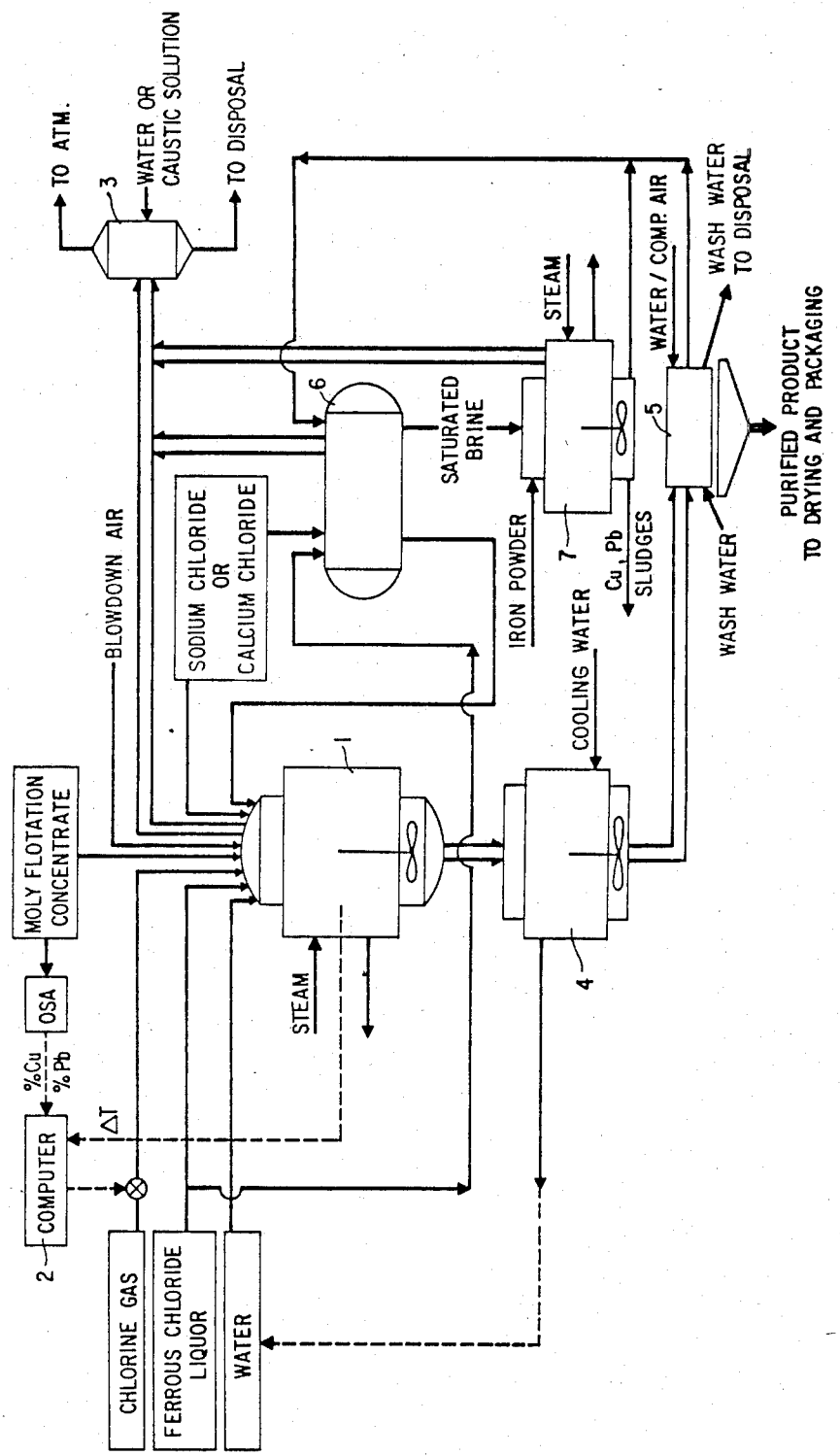

PROCESS FOR PURIFYING MOLYBDENITE CONCENTRATES

This invention relates to an improved process for purifying molybdenite concentrate and, more particularly, for removing impurities such as copper and lead from molybdenum flotation concentrate to a desired level.

It is well known that molybdenite is first recovered along with chalcopyrite in the form of a bulk flotation concentrate where pyrite, galena and silicate gangue form the major impurities. This bulk flotation concentrate is then re-floated using a reagent such as sodium hydrosulfide to yield a moly flotation concentrate that typically assays about 50–55% Mo, 0.25–2.50% Cu and 0.1–2.0% Pb.

The market standards for premium grade molybdenite concentrate require that the copper impurity be reduced to less than 0.15% and that the lead impurity be reduced to less than 0.05%.

Applicants have already patented a leaching process for purifying molybdenite concentrates (cf. U.S. Pat. No. 3,674,424 of July 4, 1972 assigned to Brenda Mines Ltd. The present invention is an improvement thereof.

As disclosed in the above mentioned U.S. Pat. No. 3,674,424, as well as in several other patents such as German Pat. No. 379,315 of Oct. 25, 1922 and U.S. Pat. No. 4,083,921 of Apr. 11, 1978, one of the most common leaching mediums for purifying molybdenite concentrate is a solution of ferric chloride which reacts with the copper and lead impurities according to the following equations:

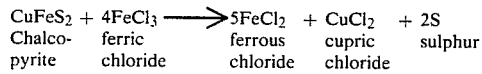

and

Once the above reactions have taken place, the ferrous chloride can be regenerated back to ferric chloride by chlorination as follows:

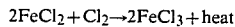

One of the major problems encountered in such processes is that ferric chloride is extremely corrosive and can cause severe equipment damage if the protective linings fail. For this reason, hydrometallurgical processes employing ferric chloride as reagent are very unpopular in industry since they require special materials of construction for the equipment to protect it against severe corrosion and, even then, equipment such as pumps, filter presses and the like must be repaired frequently or replaced making the entire process very costly and unattractive.

The principal object of the present invention is to obviate or substantially reduce the problems encountered heretofore by restricting the presence of ferric chloride only to a vessel where the leaching reactions actually take place and essentially eliminate it from the remainder of the equipment used in the process, while achieving satisfactory purification of molybdenite concentrate.

In accordance with the invention, the above object is achieved by a process of treating molybdenite concentrate for the removal of impurities such as copper and lead therefrom which comprises:

Providing a reactor with heating and agitator means, which reactor is made of a material that can withstand leaching with the use of ferric chloride containing brine at elevated temperatures and pressures; introducing into said reactor ferrous chloride liquor and make-up water to give a predetermined iron concentration such that, upon chlorination, a sufficient amount of ferric ion will be formed to leach the impurities present in the molybdenite concentrate from their initial to the desired final concentrations; sealing the reactor; insuring that the solution temperature in the reactor is between about 40° C. and 60° C.; injecting chlorine gas into the reactor while agitating the solution until the temperature rises to a point which, due to the exothermicity of the chlorination reaction, indicates through the temperature difference between the initial value and the final value that the chlorination has produced the required amount of ferric ion in the solution to leach the impurities from their initial concentrations, determined from an assay of the molybdenite concentrate to be leached, to the desired final concentrations; upon completion of the chlorination resulting in the formation of a batch of brine suitable for leaching the molybdenite concentrate, venting the reactor to a scrubber and adding a predetermined amount of the molybdenite concentrate to be leached; thereafter sealing the reactor and heating its contents to a temperature suitable for leaching and continuing the leaching operation under agitation until the desired reduction in the concentrations of the impurities in the molybdenite concentrate has been achieved and the ferric ion essentially fully consumed; upon completion of the leaching operation, filtering and washing the resulting pulp until a desired purified product is obtained.

The ferrous chloride liquor, which is initially introduced into the reactor, is preferably spent pickling liquor from steel mills. It contains about 15% iron as ferrous chloride and about 3% HCl and, since it constitutes a waste liquor from steel mills, it can be obtained at a relatively economic cost. However, where spent pickling liquor is not readily available, a ferrous chloride solution can be readily prepared by pickling scrap iron or steel with a dilute solution of hydrochloric acid. The cost of such operation is, again, very low. Such ferrous chloride liquor is far less corrosive than a ferric chloride solution and is less difficult to handle. It is introduced into the reactor and is made up with water to give an iron concentration of about 40–60 gpl, although the exact amount is determined by the nature and level of impurities in the concentrate to be leached.

The reactor itself is preferably glass-lined to withstand the ferric chloride leaching. A number of commercial glass-lined steel autoclaves can be used for this purpose.

The saturation point of lead chloride in an iron chloride brine is in the comparatively low range of 1–2 gpl. Because of such low saturation point, precipitated lead chloride will report to the final molybdenum concentrate if an attempt is made to recirculate the brine. Not recirculating brine is costly and economically inefficient and, for this reason, sodium chloride or calcium chloride is preferably added in an amount close to their saturation value in the brine when lead is present as impurity. The role of these reagents is to complex the lead chloride ion as $(PbCl_3)^-$, $(PbCl_5)^-$ or similar species. The solubility of the complexed lead ion is thus increased to about 10 gpl when sodium chloride is used and to about 15 gpl when calcium chloride is employed. In the case of sodium chloride, it should be added in an amount to give a sodium concentration of about 70–80 gpl, preferably 75 gpl in the brine, whereas in the case of calcium chloride, it should be added in an amount to give a calcium concentration of about 110–120 gpl, preferably about 115 gpl. In spite of the fact that calcium chloride gives a higher saturation point for lead, sodium chloride is preferred because it is far less costly than calcium chloride. These reagents may also be added in order to elevate the boiling point of the solution and thus operate at a lower pressure.

The controlled chlorination within the reactor converts just the required amount of ferrous chloride to ferric state and the control is effected by monitoring the rise in temperature due to the exothermicity of the reaction, according to the following equation:

$$\Delta T = C(F - F_1)$$

where $C$ = system constant $(°C.)(gpl\ Fe^{+++})^{-1}$
$F$ = required ferric concentration (gpl)
$F_1$ = ferric concentration already in brine, if any (gpl)
$\Delta T$ = required temperature rise which will indicate completion of chlorination (°C.) and the ferric ion requirement is given by the following equation:

$$Fe^{+++} = K_1(\%\ copper) + K_2(\%\ lead) + K_3$$

In the first equation given above, the constant C depends on the reactor used for chlorination, namely on its geometry, insulation, etc. It is determined by experiment, i.e. by providing a known quantity of brine in the reactor with a known quantity of ferrous ions therein and chlorinating this brine for a predetermined period of time and determining the rise in temperature achieved and the quantity of ferric ion generated. Several such tests will establish the constant C for any given reactor. It should also be noted that any units are suitable so long as they are used consistently.

The constants in the second equation are developed by calculating the amount of ferric chloride required for a given amount of impurities, such as copper and lead present in the molybdenite concentrate to be treated (e.g. copper and lead assays) in conjunction with a given weight of moly flotation concentrate and volume of brine used and the nature of the concentrate mineralogy. All these calculations can readily be made by a man familiar with this art. It is also preferred to use a computer and the chlorination reaction can then be controlled by computer which would also provide for an automatic shut-off of the chlorine intake when the computed rise in temperature has been reached, which rise is calculated also by the computer on the basis of the copper/lead feed assays of the concentrate to be treated and the other relevant parameters. These assays can be provided by an on-stream analyzer or in any other suitable way. In the case of Brenda Mines Ltd., where the copper impurity is essentially present as chalcopyrite, the lead impurity as galena and there are only small amounts of other substances which consume ferric ion, such as bismuth and calcite, the above constants have been determined to be $K_1 = 36.9$, $K_2 = 3.2$ and $K_3 = 3.69$. It should generally be understood that constant $K_1$ depends on the amount of copper present in the concentrate and on the amount of ferric ion consumed to leach out such copper impurity; constant $K_2$ similarly depends on the lead impurity and constant $K_3$ depends on other substances present in the concentrate, which lead to the consumption of ferric ion, and also provides for a safety factor in the leaching reaction.

Once the chlorination is completed, the reactor is vented through a scrubber and the predetermined amount of molybdenite concentrate is introduced into the reactor. Thereafter, the reactor is sealed and heated to the leaching temperature and then held under agitation until the desired reduction in the impurities, e.g. copper/lead values, has been achieved and the ferric ion essentially fully consumed. The leaching operation is preferably carried out at a temperature between about 100° C. and the boiling point of the brine at the equilibrium pressure which builds up in the reactor and which is normally between about 10 and 25 psig ($\sim$70–175 kPa). Upon completion of the leaching operation, the reactor is evacuated, for example, with the use of blow-down air, and the resulting pulp is filtered and washed to obtain the final desired product. The pulp is preferably cooled prior to filtering so as to avoid damage to the filter plates. The spent brine from the filtering operation can be made up with additions of ferrous chloride liquor and, if necessary, sodium chloride or calcium chloride, and recycled back into the reactor to be reused in the next batch. However, such recycling can only be carried out until lead in the brine reaches a value close to its saturation point, at which time the brine can be sent to a purifying process where the lead, copper and any other impurities, such as silver, are precipitated to allow further brine recirculation. This, for example, can be accomplished by contacting the brine which is not yet saturated with lead or copper with iron powder in a suitably vented vessel. In this manner, at temperatures starting in the range of about 20°–25° C., copper is precipitated, while at about 90°–100° C. lead in metallic form is precipitated. Since this procedure adds iron to the brine, it further enhances the brine regeneration. Alternatively, lead and/or copper chloride may be allowed to precipitate from the saturated brine into the concentrate and subsequently removed by washing the filter cake in the filter press with a salt solution of sodium chloride or calcium chloride. Alternatively, the saturated brine can be discarded and a fresh batch prepared.

A thorough washing of the filter cake is important, both in order to displace any residual brine and to dissolve any precipitated salts in the product.

Finally, the obtained high grade product will normally be dried before being packaged and shipped to the market.

The single FIGURE appended hereto is a flowsheet illustrating a preferred embodiment of the process according to the present invention.

As illustrated in the FIGURE, there is provided a 2000 USG ($\sim$7500 liter) commercial glass-lined reactor 1. 800 Imperial gallons ($\sim$3600 liters) of brine are introduced into the reactor consisting of spent pickling liquor and water to give an iron concentration in the brine of about 50 gpl. 520 kg of NaCl are also added into the reactor to give a sodium concentration of about 75 gpl. The reactor is then sealed and chlorination is carried out in situ. The chlorination time is aimed at producing exactly the amount of ferric ion required to leach copper and lead in the moly flotation concentrate to be treated from their initial to their desired final concentrations. Normally, this time is between 10 and 30 minutes and it is controlled by computer 2 through the sensing of the required temperature rise produced by the exothermic reaction in the reactor to achieve the desired ferric ion concentration for a given % Cu and % Pb fed byan onstream analyzer(OSA). The initial brine temperature in the reactor should be in the range of 40° C.–60° C. to permit efficient chlorination.

Upon completion of the chlorination in the reactor 1, the reactor is vented to a scrubber 3. Then, approximately 2½ tons (2250 kg) of moly flotation concentrate are added into the reactor 1. The reactor is then sealed, brought to the desired temperature by heating with steam (preferably to 100° C.–120° C.), and the leaching reaction is allowed to take place under agitation. It lasts approximately 1–2 hours. Upon completion of the leaching reaction, the reactor is evacuated, with the use of blowdown air, into a cooling vessel 4 with agitating means, where the pulp is cooled to about 60° C.–70° C. with the use of cooling water, which can then be used as process water. Then the pulp is filtered in the filter press 5 from which the first filtrate becomes the spent brine which is forwarded to the brine storage tank 6 where make-up additions of ferrous chloride liquor and, if necessary, sodium or calcium chloride are made before the brine is recycled to reactor 1. It should be noted that, preferably, three reactors 1 are used so that while chlorination is carried out in one of these reactors, the leaching can proceed in the other and the third can be used as a standby reactor, thus operating the process essentially on a continuous basis.

After recovery of the spent brine, the obtained purified filter cake is normally water washed and semidried in the filter whereupon the final filter cake is recovered and then dried prior to packaging for shipment.

As already mentioned, when the recycled brine in storage tank 6 reaches a point close to saturation with lead, it may be sent to a reactor vessel 7 where the precipitation process is carried out. Iron powder is added to the vessel and the temperature is raised to about 70° C. to remove copper. After withdrawing the copper sludge, the brine temperature is increased to about 95° C. to remove lead. This sludge is removed separately. The brine is then returned to the brine storage tank 6. The sludges have commercial value and should be filtered and dried for eventual sale. Alternatively, the saturated brine can be discarded and a fresh batch prepared.

Although the invention has been described and illustrated with reference to a specific embodiment which represents the best mode known to the applicant of carrying out the invention in practice, it should be understood that it is not limited thereto and various modifications obvious to a man familiar with this art can be made without departing from the spirit of the invention and the scope of the following claims.

We claim:

1. A process for purifying molybdenite concentrate for the removal of impurities therefrom, which comprises: providing a reactor with heating and agitator means, which reactor is made of a material that can withstand leaching with the use of ferric chloride containing brine at elevated temperatures and pressures; introducing into said reactor ferrous chloride liquor and make-up water to give a predetermined iron concentration such that, upon chlorination, a sufficient amount of ferric ion will be formed to leach the impurities present in the molybdenite concentrate from their initial to desired final concentrations; sealing the reactor; insuring that the solution temperature in the reactor is between about 40° C. and 60° C.; injecting chlorine gas into the reactor while agitating the solution until the temperature rises to a point which, due to the exothermicity of the chlorination reaction, indicates through the temperature difference between the initial value and the final value, that the chlorination has produced the required amount of ferric ion in the solution to leach the impurities from their initial concentrations, determined from an assay of the molybdenite concentrate to be leached, to the desired final concentrations; upon completion of the chlorination resulting in the formation of a batch of brine suitable for leaching the molybdenite concentrate, venting the reactor to a scrubber and adding a predetermined amount of the molybdenite concentrate to be leached; thereafter sealing the reactor and heating its contents to a temperature suitable for leaching and continuing the leaching operation under agitation until the desired reduction in the impurities' concentrations has been achieved and the ferric ion essentially fully consumed; upon completion of the leaching operation, filtering and washing the resulting pulp to obtain the desired purified product.

2. Process according to claim 1, in which the reactor is glass-lined.

3. Process according to claim 1, in which the ferrous chloride liquor is spent pickling liquor from steel mills.

4. Process according to claim 1, in which sodium or calcium chloride is also added to the solution when lead is present as impurity or when it is desired to raise the boiling point of the brine.

5. Process according to claim 4, in which, when sodium chloride is added, it is added in an amount to give a sodium concentration of about 70–80 gpl.

6. Process according to claim 4, in which, when calcium chloride is added, it is added in an amount to give a calcium concentration of about 110–120 gpl.

7. Process according to claim 1, in which the temperature rise in the reactor is determined according to the following equation:

$$\Delta T = C(F - F_1)$$

where
C = system constant
F = required ferric concentration
$F_1$ = ferric concentration already in brine
$\Delta T$ = required temperature rise which will indicate completion of chlorination.

8. Process according to claim 7, wherein the chlorination reaction is controlled by computer and provides for an automatic shut-off of the chlorine intake when the computed rise in temperature has been reached, which rise is calculated by the computer on the basis of the feed assays of the concentrate to be treated.

9. Process according to claim 1, wherein the leaching operation is carried out at a temperature between about 100° C. and the boiling point of the brine and at the equilibrium pressure which builds up in the reactor.

10. Process according to claim 1, wherein the resulting pulp is cooled prior to filtering.

11. Process according to claim 1, wherein the spent brine from the filtering operation is made up with additions of ferrous chloride liquor and, when required, sodium or calcium chloride, and is recycled to be reused in the next batch.

12. Process according to claim 11, wherein the recycling is carried out until lead or copper in the brine reaches a concentration close to its saturation point, at which time the brine is treated with iron powder to cause precipitation of the lead and copper in metallic form to allow further recycling of the brine.

13. Process according to claim 11, wherein the recycling is carried out until the brine becomes saturated, at which time copper and/or lead chloride is allowed to precipitate to the concentrate from the saturated brine solution and is subsequently removed from the filter cake by washing with a salt solution of sodium chloride or calcium chloride.

14. Process according to claim 11, wherein the recycling is carried out until lead or copper in the brine reaches a concentration close to its saturation point, at which time the brine is discarded and a new batch is prepared.

* * * * *